(12) United States Patent
Andgart et al.

(10) Patent No.: US 8,675,788 B2
(45) Date of Patent: Mar. 18, 2014

(54) CORRECTION OF FREQUENCY OFFSETS GREATER THAN THE NYQUIST FREQUENCY

(75) Inventors: Niklas Andgart, Södra Sandby (SE); Peter Alriksson, Hörby (SE); Joakim Axmon, Kavlinge (SE); Bengt Lindoff, Bjarred (SE); George Jöngren, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 247 days.

(21) Appl. No.: 13/203,744

(22) PCT Filed: Feb. 22, 2010

(86) PCT No.: PCT/EP2010/052182
§ 371 (c)(1),
(2), (4) Date: Aug. 29, 2011

(87) PCT Pub. No.: WO2010/097357
PCT Pub. Date: Sep. 2, 2010

(65) Prior Publication Data
US 2011/0311005 A1    Dec. 22, 2011

Related U.S. Application Data

(60) Provisional application No. 61/160,005, filed on Mar. 13, 2009.

(30) Foreign Application Priority Data

Feb. 27, 2009  (EP) .................................. 09153947

(51) Int. Cl.
*H04L 27/06*  (2006.01)

(52) U.S. Cl.
USPC ............ 375/344; 375/343; 375/142; 370/252

(58) Field of Classification Search
USPC ....................... 375/343, 344, 142; 370/252
See application file for complete search history.

(56) References Cited

U.S. PATENT DOCUMENTS

| | | | | |
|---|---|---|---|---|
| 5,999,561 A | * | 12/1999 | Naden et al. ................... | 375/142 |
| 2011/0026649 A1 | * | 2/2011 | Lipka et al. .................... | 375/343 |
| 2013/0022158 A1 | * | 1/2013 | Panicker et al. .............. | 375/343 |
| 2013/0121188 A1 | * | 5/2013 | Das et al. ...................... | 370/252 |

FOREIGN PATENT DOCUMENTS

EP    1953978 A    8/2008

* cited by examiner

*Primary Examiner* — Eva Puente

(57) ABSTRACT

A method of estimating frequency offset of a received signal in a terminal apparatus comprises a) determining a phase change between a first and a second reference symbol of the received signal, wherein the time distance t between the first and the second reference symbols is associated with an observation frequency f such that f=1/t. The method further comprises: b) determining a preliminary frequency offset $\Delta f$ based on the determined phase change, wherein $\Delta f$ forms a frequency offset hypothesis $\Delta f_h$; and c) decoding at least a part of the received signal, with application of the frequency offset hypothesis $\Delta f_h$, to a decoded signal. The method further comprises: d) determining whether the decoded signal is a successful decoding. If the decoded signal is a successful decoding, the frequency offset hypothesis $\Delta f_h$ is determined to be the estimated frequency offset, but if the decoded signal is not a successful decoding, the frequency offset hypothesis $\Delta f_h$ is adjusted by an integer n times the observation frequency f such that $\Delta f_h = \Delta f + n \cdot f$, where n∈[+/−1, 2, 3, . . . ]. Steps c) and d) are then repeated.

13 Claims, 6 Drawing Sheets

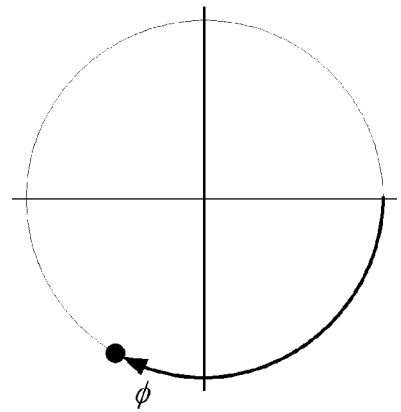
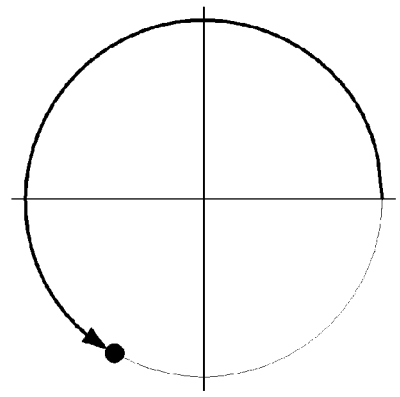
Fig. 9　　　　　　　　　　　Fig. 10
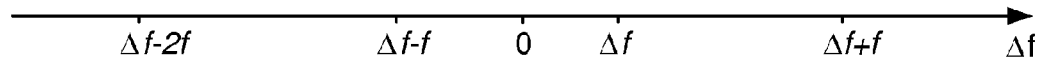
Fig. 11
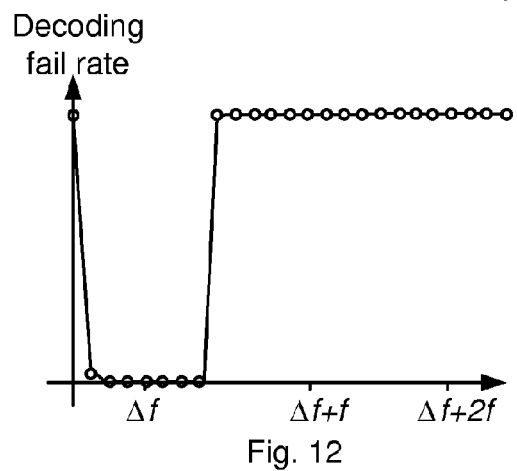
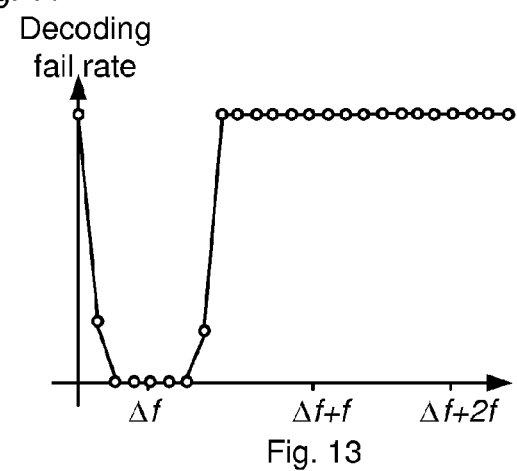
Fig. 12　　　　　　　　　　　Fig. 13
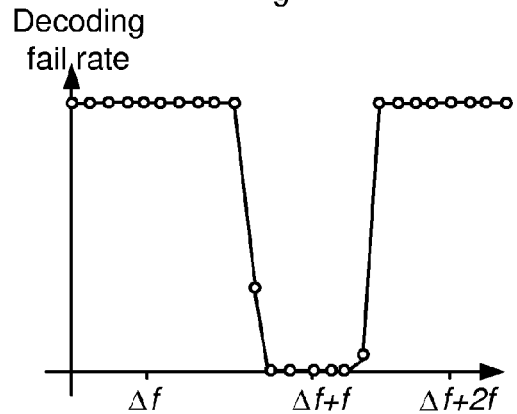
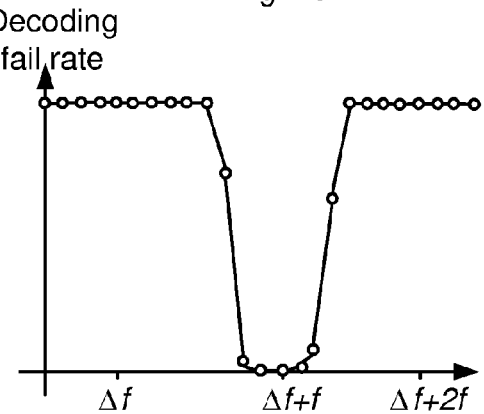
Fig. 14　　　　　　　　　　　Fig. 15

CORRECTION OF FREQUENCY OFFSETS GREATER THAN THE NYQUIST FREQUENCY

This application claims the benefit of U.S. Provisional Application No. 61/160,005, filed Mar. 13, 2009, the disclosure of which is fully incorporated herein by reference.

TECHNICAL FIELD

The present invention relates to a method of estimating frequency offset, a computer program for performing the method, a frequency controller and a terminal apparatus.

BACKGROUND

Tuning to a correct frequency at reception is important to achieve a proper wireless reception. In the case of a terminal which receives a transmission, e.g. from a base station, there can be several reasons for frequency to be corrected: drift in a reference oscillator of the terminal, Doppler effects, difference in frequency alignment for different transmitters performing the transmission, etc. To be able to correct the frequency, often referred to as 'tuning', a proper frequency offset need to be available. Here, the frequency offset is a discrepancy between an expected or preset frequency and the actual frequency on which the transmission relies.

European patent application published as EP 1 988 676 A1 discloses an analytical approach for determining a frequency error in a receiver of a wireless system. In particular, EP 1 988 676 A1 discloses an approach for an Orthogonal Frequency Division Multiplex (OFDM) receiver, where symbols of a given duration are transmitted as cells on sub-carrier frequencies where some of the cells are pilot cells modulated with reference information. The approach comprises selection of at least three pilot cells from different symbols and different sub-carriers, as illustrated by example of FIG. 1. The symbol and the sub-carrier on which each pilot cell is transmitted are determined. For each pilot cell, a phase difference is determined between received and generated signals. From that, a change in phase difference is calculated, from which the frequency error in turn is calculated. A particular advantage of this is that frequency error can be calculated from even short transmissions, such as a single resource block. A further advantage is that by selecting a multitude of pilot cells, the calculation can result in a very precise result.

However, although the result can be very precise, there are further qualities of determination of a frequency error that can be appreciated. One of them can be low demand on processing power; another can be real-time properties. The inventors have identified a further quality issue that needs to be addressed: robustness of the frequency offset estimation. The present invention is therefore inclined towards an improvement regarding this issue.

SUMMARY

The present invention is based on the understanding that, in addition to the identification of robustness issues of frequency offset estimation, determination of a phase change may give more than one solution of a frequency offset estimate. The inventors have suggested an approach where hypotheses for the different possible solutions are tested by test decoding for the hypotheses until a proper frequency offset estimate is found, or that it can be properly determined that the receiver is out-of-sync.

According to a first aspect, there is provided a method of estimating frequency offset of a received signal in a terminal apparatus operating in a wireless communication system. The method comprises a) determining a phase change between a first and a second reference symbol of the received signal, wherein the time distance t between the first and the second reference symbols is associated with an observation frequency f such that f=1/t;

b) determining a preliminary frequency offset $\Delta f$ based on the determined phase change, wherein the preliminary frequency offset $\Delta f$ form a frequency offset hypothesis $\Delta f_h$;

c) decoding at least a part of the received signal, with application of the frequency offset hypothesis $\Delta f_h$, to a decoded signal;

d) determining whether the decoded signal is a successful decoding, wherein if the decoded signal is a successful decoding, determining the frequency offset hypothesis $\Delta f_h$ to be the estimated frequency offset, and if the decoded signal is not a successful decoding, adjusting the frequency offset hypothesis $\Delta f_h$ by an integer n times the observation frequency f such that $\Delta f_h = \Delta f + n \cdot f$, where $n \in [+/-1, 2, 3, \ldots]$, and repeating steps c) and d).

An absolute value of the integer n may have an upper limit N, such that $n \in [+/-1, \ldots, N]$, and if the amount of n is exhausted through repeated performance of steps c) and d), the method may continue with determining that no frequency offset was found. The method may further comprise, if determined that no frequency offset was found, performing a cell search.

The at least a part of the received signal may comprise a Physical Broadcast Channel.

The determining of whether the decoded signal is successful may comprise determining if a check sum is correct.

For each adjustment of the preliminary frequency $\Delta f$, the integer n may be chosen such that the frequency offset hypothesis $\Delta f_h$ is as small as possible without selecting a previously selected integer n.

The application of the preliminary frequency offset may comprise adjusting the receiver in time domain with the preliminary frequency offset. Additionally or alternatively, the application of the preliminary frequency offset may comprise adjusting the signal in frequency domain with a phase rotation corresponding to the preliminary frequency offset. The application of the preliminary frequency offset may comprise adjusting the receiver in frequency domain with the preliminary frequency offset for absolute values of the integer n being less than 2; and the application of the preliminary frequency offset may comprise adjusting the receiver in time domain with the preliminary frequency offset for absolute values of the integer n being 2 or more. The number 2 is found suitable for exemplary systems, but may be for example 3 or 4 where found suitable for other systems.

The wireless communication system may be a Third Generation Partnership Project Long Term Evolution system, and the first reference symbol may be gathered from a Secondary Synchronization Channel, and the second reference symbol may be gathered from a Primary Synchronization Channel.

According to a second aspect, there is provided a computer program comprising computer executable program code, the program code comprising instructions arranged to cause a processor to perform the method according to the first aspect.

According to a third aspect, there is provided a frequency controller, for a terminal apparatus operating in a wireless communication system, comprising a frequency offset estimator comprising signal processing means arranged to perform the method according to the first aspect; and a frequency adjustment control signal generator arranged to output a control signal, suitable for adjustment of a frequency generator, based on the frequency offset estimate.

According to a fourth aspect, there is provided a terminal apparatus, for operating in a wireless communication system, comprising a radio receiver; a frequency controller according to the third aspect; and a frequency generator arranged to provide a reference frequency to the radio receiver, wherein the frequency generator is arranged to be controlled by the frequency controller for adjustment of the frequency output of the frequency generator.

BRIEF DESCRIPTION OF DRAWINGS

FIG. 9 schematically illustrates a determined phase change.

FIG. 10 schematically illustrates a different representation of the determined phase change of FIG. 9.

FIG. 11 schematically illustrates assignment of hypotheses of frequency offsets.

FIG. 12 is a chart illustrating a test of decoding fail rate for different frequency offset corrections made in the frequency domain at signal-to-noise ratio (SNR) of 25 dB and correct frequency offset being Δf.

FIG. 13 is a chart illustrating a test of decoding fail rate for different frequency offset corrections made in the frequency domain at SNR of −3 dB and correct frequency offset being Δf.

FIG. 14 is a chart illustrating a test of decoding fail rate for different frequency offset corrections made in the frequency domain at SNR of 25 dB and correct frequency offset being Δf+f.

FIG. 15 is a chart illustrating a test of decoding fail rate for different frequency offset corrections made in the frequency domain at SNR of −3 dB and correct frequency offset being Δf+f.

DETAILED DESCRIPTION

Figure 2:
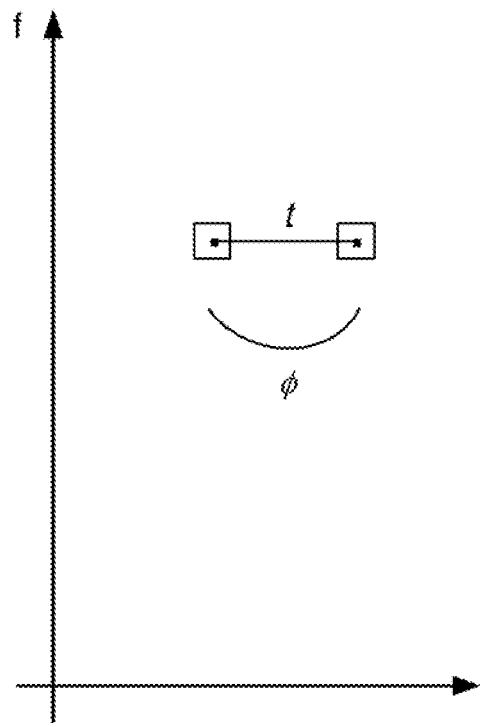
FIG. 2 illustrates two reference symbols for frequency offset estimation according to an embodiment.

The invention relies on ability to determine a change in phase between reference symbols, i.e. symbols having properties such that information on transmission can be obtained. This can be from assigned symbols comprising known information or from symbols having a mutual relation such that transmission properties can be derived therefrom. The term symbol is to be interpreted as a chunk of information that is extractable and handable from a transmission, i.e. the size of the symbol depend on particulars of the system or gear involved in the transmission. Examples are pilot symbols, synchronization symbols, and cyclic prefixes. By selecting a first and a second reference symbol, as for example illustrated in FIG. 2, a change in phase $\phi$ in relation to a frequency used or presumed by the receiver at reception can be determined as a drift in phase between the two symbols. A time distance t between the symbols is presumed to be known or measured. In addition to using the time distance t for determining a preliminary frequency offset Δf between the frequency of the received signal and the frequency used or presumed by the receiver, the time distance t is also used for determining ambiguities of the estimate of the frequency offset.

For the understanding of the ambiguity of the estimate, FIG. 9 is a diagram illustrating the observed phase change $\phi$ as a dot in the diagram, where representation of the phase change $\phi$ is illustrated by the arrow along the circle from a "zero-phase" position to the observed phase position. FIG. 10 illustrates an alternative representation of the same observed phase position. From this, it can be understood that the conclusion about the frequency offset can have ambiguities in similar way.

Returning to FIG. 2, as the time distance t can be considered to give an observation frequency f, which is 1/t, from which we can specify a Nyquist frequency of the observation, or "sampling", of the received signal which is f/2. If the true frequency offset is below Nyquist frequency, the preliminary frequency offset Δf will be a proper estimate. However, if the true frequency offset is above the Nyquist frequency, a robustness issue of determining the frequency offset will occur. According to the invention, this is dealt with by taking folding effects into account, i.e. at multiples of twice the Nyquist frequency, which is multiples of the observation frequency f. These are used as additional hypotheses to a first hypothesis of the frequency offset, which is determined to be the preliminary frequency offset Δf. The practical handling of this will be further demonstrated below.

Figure 3:
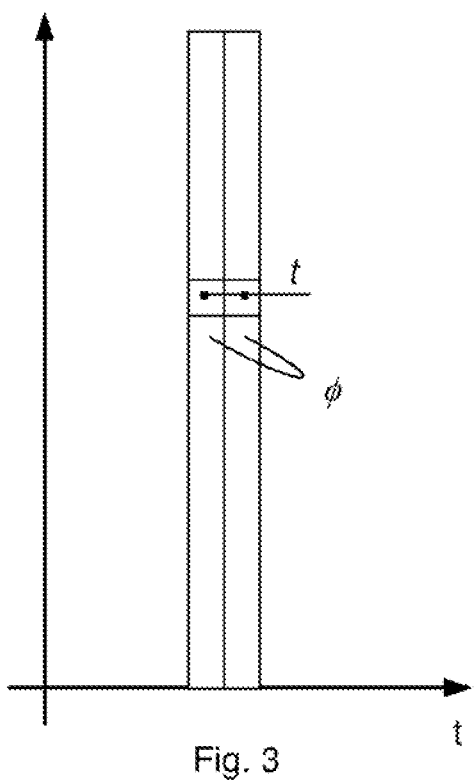
FIG. 3 illustrates two reference symbols, among available reference symbols in a communication system according to an example, for frequency offset estimation according to an embodiment.

FIG. 3 illustrates two reference symbols, among available reference symbols in a communication system according to an example, for frequency offset estimation according to an embodiment. In the communication system of the example there are on each carrier frequency present a secondary synchronization symbol directly followed by a similarly arranged primary synchronization symbol (PSS). The system can for example be Third Generation Partnership Project Long Term Evolution (3 GPP LTE) system working in its Frequency Division Duplex (FDD) mode. In that case, the nominal distance between the symbols is 0.07 ms, which gives a Nyquist frequency of about 7 kHz. Nyquist frequencies for other operation modes, such as Time Division Duplex (TDD), and use of normal or extended cyclic prefix, are given in Table 1 below.

Figure 4:
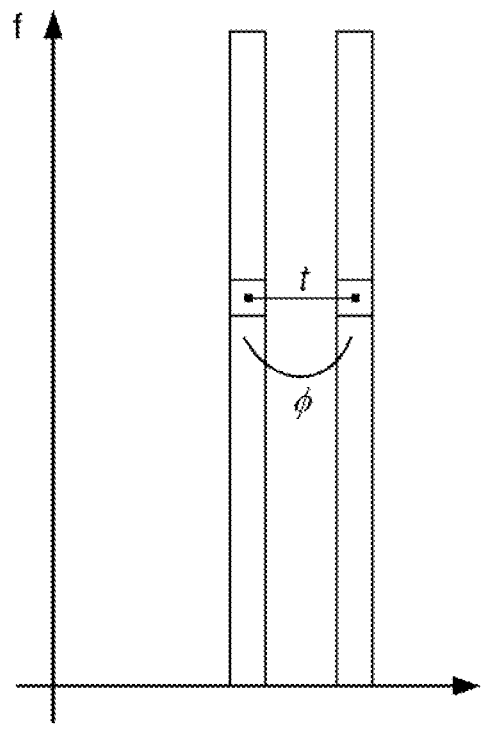
FIG. 4 illustrates two reference symbols, among available reference symbols in a communication system according to an example, for frequency offset estimation according to an embodiment.

FIG. 4 illustrates two reference symbols, among available reference symbols in a communication system according to an example, for frequency offset estimation according to an embodiment. In the communication system of the example there are on each carrier frequency present a secondary synchronization symbol (SSS) followed by a similarly arranged primary synchronization symbol, however in this case with some more distance between the symbol. The system can for example be 3 GPP LTE system working in its Time Division Duplex mode. In that case, the nominal distance between the symbols is 0.21 ms, which gives a Nyquist frequency of about 2.33 kHz.

Figure 1:
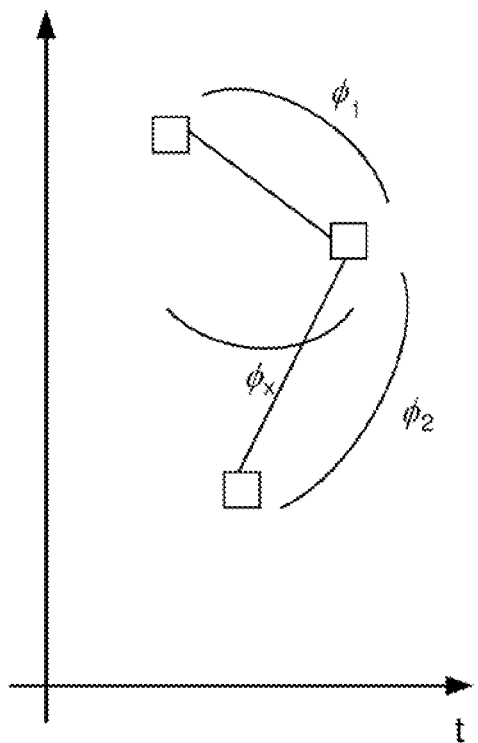
FIG. 1 illustrates selection of pilot cell pairs for frequency error determination according to a prior art solution.

Using a normal cyclic prefix for 3 GPP LTE gives a Nyquist frequency of about 7.5 kHz, and using dedicated pilot symbols, cf. FIG. 1, gives an even lower Nyquist frequency, 2.33 kHz, and thus smaller capturing range for the frequency offset, unless the hypothesis approach described herein is employed. Table 1 below gives an indication on Nyquist frequencies for different scenarios in 3GPP LTE.

TABLE 1

|  | Synchronization symbols | Pilot symbols |
|---|---|---|
| FDD, normal cyclic prefix | 7 kHz | 2.3 kHz |
| FDD, extended cyclic prefix | 6 kHz | 2 kHz |
| TDD, normal cyclic prefix | 2.3 kHz | 2.3 kHz |
| TDD, extended cyclic prefix | 2 kHz | 2 kHz |

Figure 5:
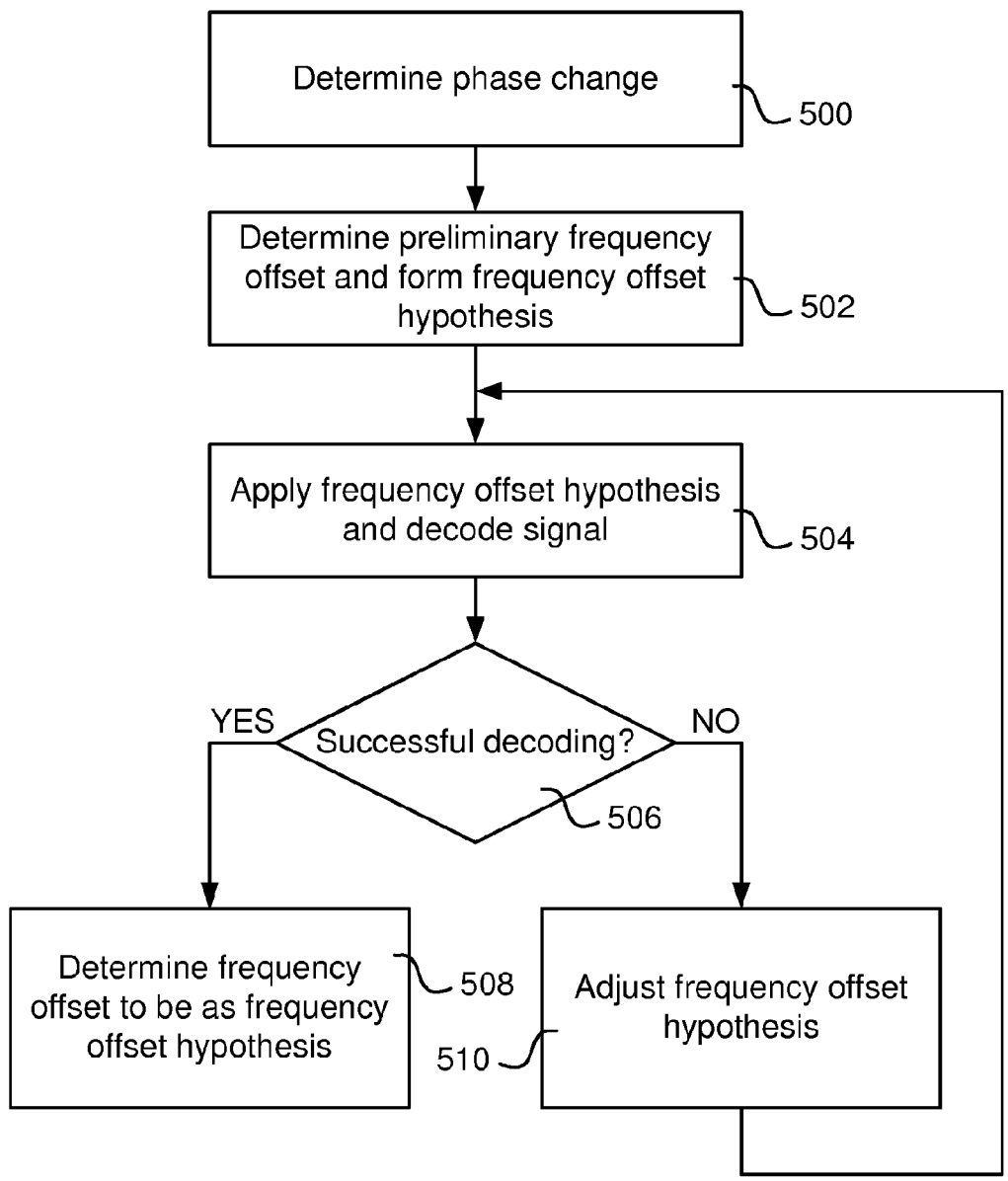
FIG. 5 is a flow chart illustrating a method according to an embodiment.
Figure 8:
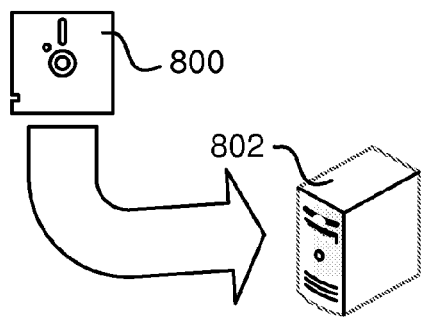
FIG. 8 schematically illustrates a computer readable medium holding a computer program according to an embodiment.

FIG. 5 is a flow chart illustrating a method according to an embodiment. The method according to this embodiment and the further embodiments of the method that will be described further below are relevant for a terminal apparatus operating in a wireless communication system, preferably embodied as will be demonstrated with reference to FIGS. 18 and 19.

In a phase change determination step 500, a phase change φ between a first and a second reference symbol is determined. Inherent by the selection or availability of the reference symbols, which have reference characteristics as elucidated above, is a time distance t. Thus, in a preliminary frequency offset determination step 502, a preliminary frequency offset $\Delta f$ is determined. This is possible based on the phase change φ and the time distance t. In the preliminary frequency offset determination step 502, the preliminary frequency offset $\Delta f$ also form a frequency offset hypothesis $\Delta f_h$. In a test decoding step 504, the signal, or at least the part of the signal used for decoding, is corrected by application of the frequency offset hypothesis $\Delta f_h$ and at least a part of the received signal is decoded. The at least part of the received signal can be a Physical Broadcast Channel (PBCH), when considering a 3 GPP LTE system, which is rather easily extracted from the signal by extracting the 72 subcarriers corresponding to the PBCH. In a decoding checking step 506, it is checked if the decoding was successful. This can be done by observing if a cyclic redundancy check is proper. If the decoding is determined to be successful in the decoding checking step 506, the method proceeds to a frequency offset determination step 508 where the frequency offset is determined to be the (latest) frequency offset hypothesis, which forms an output of the frequency offset estimation method. If the decoding is determined to be unsuccessful, the method proceeds to a frequency offset hypothesis adjustment step 510. Here, a the next frequency offset hypothesis to be tested is assigned as the preliminary frequency offset plus an integer, positive or negative, times an observation frequency f, where the observation frequency is the inverse of the time distance between the reference symbols, i.e. f=1/t. Thus, the adjusted frequency offset hypothesis is $\Delta f_h = \Delta f + n \cdot f$, where $n \in [+/-1, 2, 3, \ldots ]$.

The selection of integer n is preferably made such that the hypotheses are tested in an order such that the frequency distance to preliminary frequency offset is kept as low as possible, or the frequency offset hypothesis $\Delta f_h$ is as small as possible. Thus, n can be selected to 1, then to −1, then to 2 and then to −2, and so on, or to −1, then to 1, then to −2 and then to 2, and so on, for each adjustment of the hypothesis.

When the frequency offset hypothesis has been adjusted in the frequency offset hypothesis adjustment step 510, the method returns to proceed with the test decoding step 504. The testing of hypotheses is then performed until successful decoding is achieved and the frequency offset can be determined. As will be seen in the embodiment demonstrated with reference to FIG. 6, the number of reasonable hypotheses can be limited.

Figure 6:
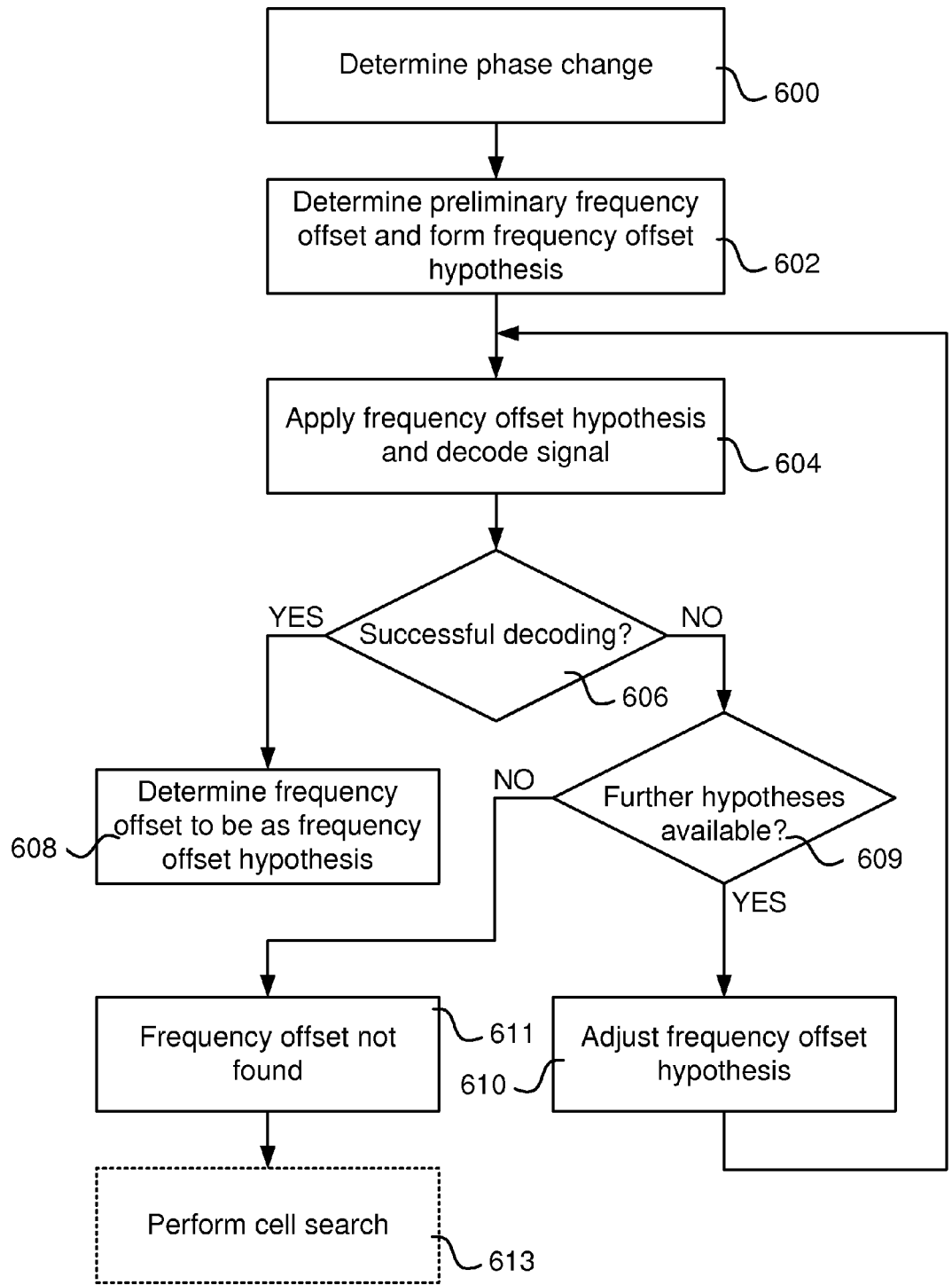
FIG. 6 is a flow chart illustrating a method according to an embodiment.

FIG. 6 is a flow chart illustrating a method according to an embodiment. The method comprises a phase change determination step 600, a preliminary frequency offset determination step 602, a test decoding step 604, a decoding checking step 606, and a frequency offset determination step 608, very much similar to corresponding steps of the embodiment demonstrated with reference to FIG. 5. However, if the decoding is determined to be unsuccessful in the decoding checking step 606, the method proceeds to a hypothesis availability checking step 607. In the hypothesis availability checking step 609, it is checked if any further hypotheses are to be tried. For example, the hypotheses can be limited by limiting the absolute value of n to a limited value N, e.g. 2. In that example, when the hypothesis with the preliminary frequency offset value, the hypotheses with integer n set to 1, −1, 2, and −2 are tried, it is considered than no further hypothesis is available. Thus, if it is considered in the hypothesis availability checking step 609 that a further hypothesis is available, the method proceeds to a frequency offset hypothesis adjustment step 610, which is similar to the corresponding step of the embodiment demonstrated with reference to FIG. 5, and when the frequency offset hypothesis has been adjusted in the frequency offset hypothesis adjustment step 610, the method returns to proceed with the test decoding step 604. On the other hand, if it is considered in the hypothesis availability checking step 609 that no further hypothesis is available, the method proceeds to a frequency offset finding failure determination step 611 where it is determined that no frequency offset was found, which then is an alternative output of the frequency offset estimation method. Optionally, the method can also comprise a cell search step 613, which thus is performed when no frequency offset is found.

Figure 7:
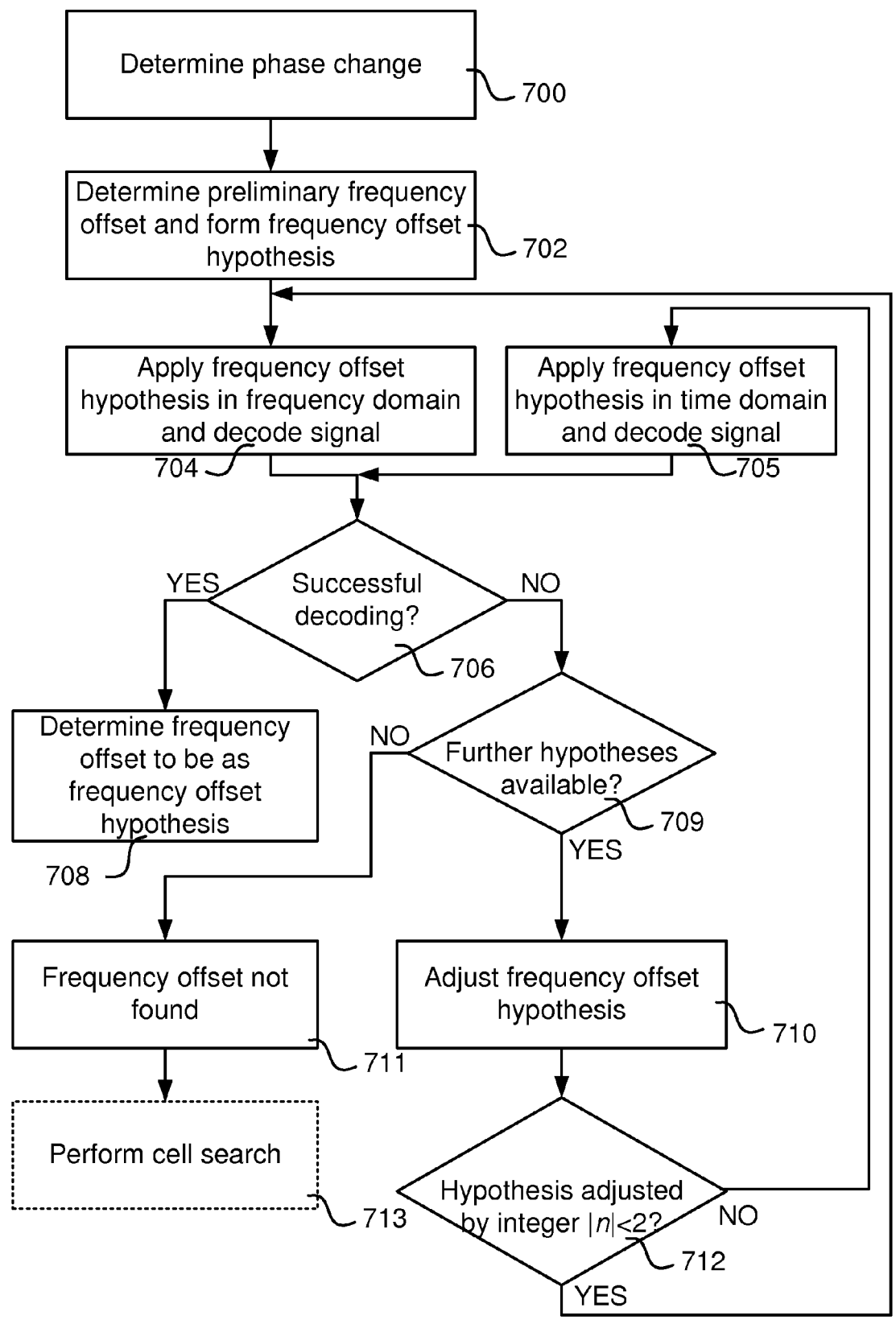
FIG. 7 is a flow chart illustrating a method according to an embodiment.

FIG. 7 is a flow chart illustrating a method according to an embodiment. The method comprises a phase change determination step 700, a preliminary frequency offset determination step 702, a test decoding step 704, a decoding checking step 706, and a frequency offset determination step 708, a further hypotheses availability checking step 709, a frequency offset hypothesis adjustment step 710, a frequency offset finding failure determination step 711, and an optional cell search step 713, very much similar to corresponding steps of the embodiment demonstrated with reference to FIG. 6. However, in the test decoding step 704, the frequency offset hypothesis is explicitly applied in the frequency domain. In a hypothesis order checking step 712 following the frequency offset hypothesis adjustment step 710, it is checked whether the absolute value of the integer n has reached a threshold, e.g.

2. If it has, the method proceeds to a second test decoding step 705 where the signal is corrected by application of the frequency offset hypothesis $\Delta f_h$ in time domain and at least a part of the received signal is decoded. Thus, any transformation to frequency domain for the processing needs to be re-performed. Although more processing intense, doing this reduces inter-carrier interference, which can be an issue as will be discussed with reference to FIGS. 12 to 17 below. On the other hand, if the absolute value of the integer n has not reached the threshold, the method proceeds to the test decoding step 704 where the signal is corrected by application of the frequency offset hypothesis $\Delta f_h$ in frequency domain and at least a part of the received signal is decoded.

FIG. 11 is a diagram schematically illustrating assignment of hypotheses of frequency offsets. From the diagram, it can be seen that from the preliminary frequency offset $\Delta f$ determined from the phase change $\phi$ and time distance t between the reference symbols, which is assigned as a first frequency offset hypothesis, further frequency offset hypotheses are assigned by periodical distances of the observation frequency f in frequency.

FIGS. 12 to 17 are charts illustrating test of decoding fail rate for different frequency offset corrections made in the frequency domain for an exemplary system. The sequence of charts illustrates that frequency correction in the frequency domain for the test decoding has its limits for higher order frequency offset hypotheses. The issue for higher order hypotheses is identified by the inventors to be caused by inter-carrier interference upon calculating the corrected signal from a transformation being performed without correction in time domain. As has been demonstrated above with reference to FIG. 7, the inventors have suggested measures for alleviating this issue.

FIG. 12 is a chart illustrating a test of decoding fail rate for different frequency offset corrections made in the frequency domain at SNR of 25 dB and correct frequency offset being $\Delta f$. Here it can be seen that it is with high certainty able to decode the at least part of the signal when assigning the correct frequency offset and with a fairly good marginal. When looking at FIG. 13, which is a chart illustrating a test of decoding fail rate for different frequency offset corrections made in the frequency domain at SNR of −3 dB and correct frequency offset still being $\Delta f$. Here it can be seen that it is still with high certainty able to decode the at least part of the signal when assigning the correct frequency offset and with a fairly good marginal.

FIG. 14 is a chart illustrating a test of decoding fail rate for different frequency offset corrections made in the frequency domain at SNR of 25 dB and correct frequency offset being $\Delta f+f$. Here it can be seen that it is with high certainty able to decode the at least part of the signal when assigning the correct frequency offset and with a fairly good marginal, while at a hypothesis of $\Delta f$, it is certain that decoding will not be successful. Thus, a correct estimate of frequency offset will be provided. When looking at FIG. 15, which is a chart illustrating a test of decoding fail rate for different frequency offset corrections made in the frequency domain at SNR of −3 dB and correct frequency offset being $\Delta f+f$. Here it can be seen that it is still with high certainty able to decode the at least part of the signal when assigning the correct frequency offset but with a more narrow marginal. However, it is still feasible to achieve a proper frequency offset estimate.

Figure 16:
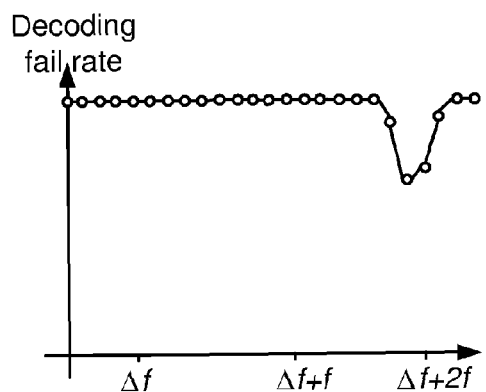
FIG. 16 is a chart illustrating a test of decoding fail rate for different frequency offset corrections made in the frequency domain at SNR of 25 dB and correct frequency offset being Δf+2 f.
Figure 17:
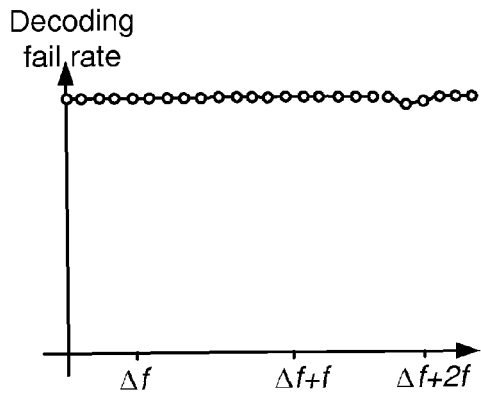
FIG. 17 is a chart illustrating a test of decoding fail rate for different frequency offset corrections made in the frequency domain at SNR of −3 dB and correct frequency offset being Δf+2 f.

FIG. 16 is a chart illustrating a test of decoding fail rate for different frequency offset corrections made in the frequency domain at SNR of 25 dB and correct frequency offset being $\Delta f+2f$. Here it can be seen that it is questionable whether it is able to decode the at least part of the signal when assigning the correct frequency offset. Thus, a correct estimate of frequency offset will be hard to provide in this example. FIG. 17 is a chart illustrating a test of decoding fail rate for different frequency offset corrections made in the frequency domain at SNR of −3 dB and correct frequency offset being $\Delta f+2f$. Here it can be seen that it is in principle not possible to decode the at least part of the signal when assigning the correct frequency offset. Thus, a correct estimate of frequency offset cannot be provided in this example.

Figure 18:
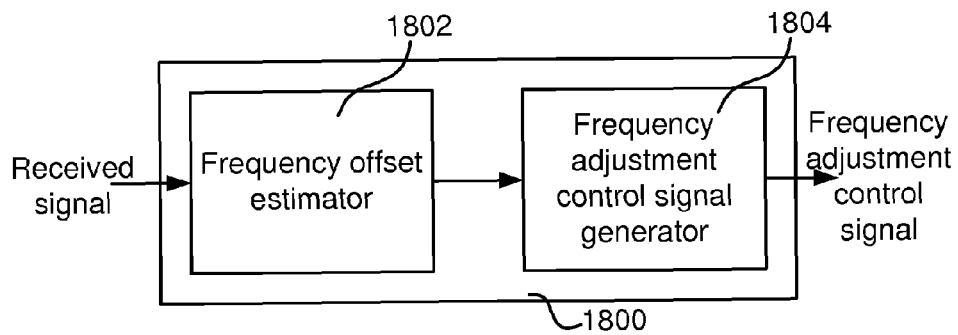
FIG. 18 is a block diagram schematically illustrating a frequency controller according to an embodiment.

FIG. 18 is a block diagram schematically illustrating a frequency controller 1800 according to an embodiment. The frequency controller comprises a frequency offset estimator 1802 and a frequency adjustment control signal generator 1804. The frequency offset estimator 1802 is fed by a received signal of which a frequency offset is to be estimated. The frequency offset estimator 1802 preferably comprises processing means, such as a signal processor which is arranged to perform the method according to any of the embodiments demonstrated above. Thus, the frequency offset estimator 1802 is able to output an estimate of the frequency offset as a frequency offset signal, or optionally that a frequency offset estimate could not be found. The frequency offset signal is provided to the frequency adjustment control signal generator 1804. The frequency adjustment control signal generator 1804 is arranged to output a control signal, suitable for adjustment of a frequency generator, based on the frequency offset estimate.

Figure 19:
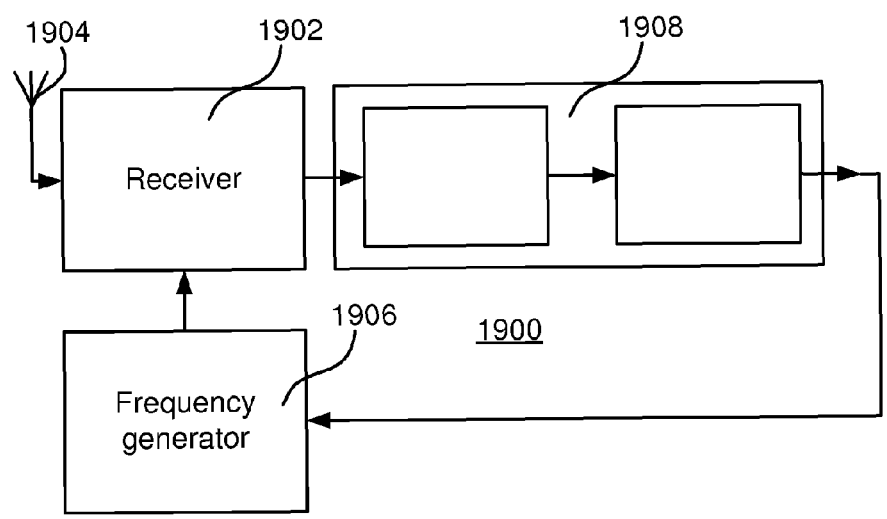
FIG. 19 is a block diagram schematically illustrating a terminal apparatus according to an embodiment.

FIG. 19 is a block diagram schematically illustrating a terminal apparatus 1900 according to an embodiment. The terminal apparatus 1900 can comprise a multitude of structural and functional elements, such as user interface, transmitter, processing means, memory, etc. These elements are however neither illustrated, nor further elucidated not to obstruct the particular elements of the invention. The terminal apparatus 1900 comprises a receiver 1902 arranged to receive a transmission from a wireless communication system, e.g. from one or more base stations, via an antenna 1904. The terminal apparatus further comprises a frequency generator 1906 which provides a reference frequency to the receiver 1902 such that the receiver is able to tune to desired transmissions. The received signal is provided to a frequency controller 1908, which has features as demonstrated with reference to FIG. 18. The frequency control signal is provided to the frequency generator 1906 for adjusting the reference frequency for proper tuning. The receiver 1902, the frequency generator 1906 and the frequency controller 1908 can be arranged as one or more functional blocks. For example, the frequency generator 1906 and the frequency controller 1908 can be integrated in the receiver 1902.

The invention is applicable in a multitude of situations. A few will be given as examples below.

At initial cell search, a first frequency estimate can be obtained from synchronization symbols, e.g. PSS. This will lead to a frequency offset estimate that may differ from the correct value more than the Nyquist frequency, as elucidated above, and the correct frequency offset is not captured. If the received message is determined not to be correctly decoded, as demonstrated above, other hypotheses are checked such that any wrap-around can be managed, such as when the transmission scenario is according to TDD in a 3GPP LTE system which have a rather small capturing range according to the discussion on Nyquist frequency above, as can be seen from Table 1 above. If no hypothesis matches, the cell search can continue on another carrier frequency.

At handover, when the terminal is passing from one cell to another in a high-speed scenario, the frequency offset can exhibit a large jump. After the handover, a correct frequency needs to be obtained before transmitting a Random Access Channel (RACH) message, i.e. prior to taking contact with the new base station. When a Received Signal Received Power (RSRP) measurement show that a neighbouring cell is stronger than the serving cell, a handover event is triggered and a handover message is transmitted. At this time, the frequency offset is estimated for the neighbouring cell. If there is a risk of wrap-around, i.e. due to high speed and e.g. TDD scenario such that the frequency offset fall outside the capturing range according to the discussion on Nyquist frequency above, the different frequency hypotheses are checked to determine what the true frequency offset is. Then, the terminal waits for receiving a handover confirmation message, and then transmits a RACH message. Depending on any constraints set by processing capabilities, the hypothesis testing can be executed between the transmission of the handover message and the transmission of the RACH message.

In case of lost synchronization, for any reason, e.g. the terminal passing close to the base station at high speed or that frequency drift and/or noise has made the frequency offset too high for being captured within the range according to the discussion on Nyquist frequency above. When such out-of-synchronization event is detected, e.g. by some control or data channel cannot be decoded, the different frequency hypotheses are used for decoding a Physical Broadcast Channel (PBCH). Thus, synchronization can be retrieved. In case this fails, the terminal can provide an initial cell search, as elucidated above.

The invention provides for improved efficiency, such that cyclic prefix based frequency offset estimation can be avoided. Cyclic prefix based offset estimation normally requires a lot of averaging and is found cumbersome in dispersive channels. Further, cyclic prefix based offset estimation also have a limited capture range of 7 kHz according to the discussion on Nyquist frequency above, which in some cases may not be enough. Using PBCH is found beneficial since the PBCH messages are designed to be robust down to very low SNRs, which makes successful decoding of correct message very likely at proper frequency offset. Further, other frequency hypotheses are sufficiently spaced away such that checking proper decoding of the message at right hypothesis and an incorrect check for wrong hypothesis gives a reliable resulting frequency offset. According to embodiments of the invention, the demands on processing power are limited, and when a proper hypothesis is found, processing can be stopped, which in most cases leads to limited processing effort. Further, latency in finding a proper frequency offset estimate is low in embodiments of the invention.

The invention claimed is:

1. A method of estimating frequency offset of a received signal in a terminal apparatus operating in a wireless communication system, the method comprising:
   a) determining a phase change between a first and a second reference symbol of the received signal, wherein a time distance t between the first and the second reference symbols is associated with an observation frequency f such that $f=1/t$;
   b) determining a preliminary frequency offset $\Delta f$ based on the determined phase change, wherein the preliminary frequency offset $\Delta f$ forms a frequency offset hypothesis $\Delta f_h$;
   c) decoding at least a part of the received signal with application of the frequency offset hypothesis $\Delta f_h$, to a decoded signal;
   d) determining whether the decoded signal is a successful decoding, if the decoded signal is a successful decoding, determining the frequency offset hypothesis $\Delta f_h$ to be the estimated frequency offset, and
   if the decoded signal is not a successful decoding:
      adjusting the frequency offset hypothesis $\Delta f_h$ by an integer n times the observation frequency f such that $\Delta f_h = \Delta f + n \cdot f$, where $n \in [+/-1, 2, 3, \ldots]$, and
      repeating steps c) and d).

2. The method according to claim 1, wherein an absolute value of the integer n has an upper limit N, where $n \in [+/-1, \ldots, N]$, and if the amount of n is exhausted through repeated performance of steps c) and d), and no further frequency offset hypothesis available, the method continues with (e) determining that no frequency offset was found.

3. The method according to claim 2, further comprising, if it is determined that no frequency offset was found, performing a cell search.

4. The method according to claim 1, wherein the at least a part of the received signal comprises a Physical Broadcast Channel.

5. The method according to claim 1, wherein the determining of whether the decoded signal is successful comprises determining if a check sum is correct.

6. The method according to claim 1, further comprising, for each adjustment of the preliminary frequency $\Delta f$, the integer n is chosen such that the frequency offset hypothesis $\Delta f_h$ is as small as possible without selecting a previously selected integer n.

7. The method according to claim 1, wherein an application of the preliminary frequency offset comprises adjusting the signal in time domain with the preliminary frequency offset.

8. The method according to claim 1, wherein an application of the preliminary frequency offset comprises adjusting the signal in frequency domain with a phase rotation corresponding to the preliminary frequency offset.

9. The method according to claim 7, wherein
   the application of the preliminary frequency offset comprises adjusting the receiver in frequency domain with the preliminary frequency offset for absolute values of the integer n being less than 2; and
   the application of the preliminary frequency offset comprises adjusting the receiver in time domain with the preliminary frequency offset for absolute values of the integer n being 2 or more.

10. The method according to claim 1, wherein:
    the wireless communication system is a Third Generation Partnership Project Long Term Evolution system,
    the first reference symbol is gathered from a Secondary Synchronization Channel, and
    the second reference symbol is gathered from a Primary Synchronization Channel.

11. A non-transitory computer-readable medium encoded with computer executable program code, the program code comprising instructions arranged to cause a processor to perform the method comprising:
    a) determining a phase change between a first and a second reference symbol of the received signal, wherein a time distance t between the first and the second reference symbols is associated with an observation frequency f such that $f=1/t$,
    b) determining a preliminary frequency offset $\Delta f$ based on the determined phase change, wherein the preliminary frequency offset $\Delta f$ forms a frequency offset hypothesis $\Delta f_h$;
    c) decoding at least a part of the received signal, with application of the frequency offset hypothesis $\Delta f_h$, to a decoded signal;

d) determining whether the decoded signal is a successful decoding, if the decoded signal is a successful decoding, determining the frequency offset hypothesis $\Delta f_h$ to be the estimated frequency offset, and if the decoded signal is not a successful decoding:

adjusting the frequency offset hypothesis, $\Delta f_h$ by an integer n times the observation frequency f such that $\Delta f_h = \Delta f + n \cdot f$, where $n \in [+/-1, 2, 3, \ldots]$, and repeating steps c) and d).

12. A frequency controller, for a terminal apparatus operating in a wireless communication system, comprising a frequency offset estimator comprising a processor arranged to:

a) determine a phase change between a first and a second reference symbol of the received signal, wherein a time distance t between the first and the second reference symbols is associated with an observation frequency f such that f=1/t;

b) determine a preliminary frequency offset $\Delta f$ based on the determined phase change, wherein the preliminary frequency offset $\Delta f$ forms a frequency offset hypothesis $\Delta f_h$;

c) decode at least a part of the received signal, with application of the frequency offset hypothesis $\Delta f_h$, to a decoded signal;

d) determine whether the decoded signal is a successful decoding, if the decoded signal is a successful decoding, determine the frequency offset hypothesis $\Delta f_h$ to be the estimated frequency offset, and if the decoded signal is not a successful decoding:

adjust the frequency offset hypothesis $\Delta f_h$ by an integer n times the observation frequency f such that $\Delta f_h = \Delta f + n \cdot f$, where $n \in [+/-1, 2, 3, \ldots]$, and repeat steps c) and d); and a frequency adjustment control signal generator arranged to output a control signal, suitable for adjustment of a frequency generator, based on the frequency offset estimate.

13. A terminal apparatus, for operating in a wireless communication system, comprising a radio receiver;

a frequency controller comprising:

a frequency offset estimator comprising d processor arranged to:

a) determine a phase change between a first and a second reference symbol of the received signal, wherein a time distance t between the first and the second reference symbols is associated with an observation frequency f such that f=1/t;

b) determine a preliminary frequency offset $\Delta f$ based on the determined phase change, wherein the preliminary frequency offset $\Delta f$ forms a frequency offset hypothesis $\Delta f_h$;

c) decode at least a part of the received signal, with application of the frequency offset hypothesis $\Delta f_h$, to a decoded signal;

d) determine whether the decoded signal is a successful decoding, if the decoded signal is a successful decoding, determine the frequency offset hypothesis $\Delta f_h$ to be the estimated frequency offset, and if the decoded signal is not a successful decoding:

adjust the frequency offset hypothesis $\Delta f_h$ by an integer n times the observation frequency f such that $\Delta f_h = \Delta f + n \cdot f$, where $n \in [+/-1, 2, 3, \ldots]$, and repeat steps c) and d); and frequency adjustment control signal generator arranged to output a control signal, suitable for adjustment of a frequency generator, based on the frequency offset estimate; and a frequency generator arranged to provide a reference frequency to the radio receiver, wherein the frequency generator is arranged to be controlled by the frequency controller for adjustment of the frequency output of the frequency generator.

\* \* \* \* \*

UNITED STATES PATENT AND TRADEMARK OFFICE
CERTIFICATE OF CORRECTION

PATENT NO. : 8,675,788 B2
APPLICATION NO. : 13/203744
DATED : March 18, 2014
INVENTOR(S) : Andgart et al.

It is certified that error appears in the above-identified patent and that said Letters Patent is hereby corrected as shown below:

On the title page, item (75), under "Inventors", in Column 1, Line 3, delete "Kavlinge" and insert -- Kävlinge --, therefor.

On the title page, item (75), under "Inventors", in Column 1, Line 4, delete "Bjarred" and insert -- Bjärred --, therefor.

In the Claims

In Column 9, Line 63, in Claim 1, delete "signal" and insert -- signal, --, therefor.

In Column 11, Line 22, in Claim 12, delete "$\Delta f_h$:" and insert -- $\Delta f_h$; --, therefor.

In Column 12, Line 5, in Claim 13, delete "d processor" and insert -- a processor --, therefor.

In Column 12, Line 30, in Claim 13, delete "frequency" and insert -- a frequency --, therefor.

Signed and Sealed this
Eighth Day of July, 2014

Michelle K. Lee
*Deputy Director of the United States Patent and Trademark Office*